(12) United States Patent
Foissey et al.

(10) Patent No.: US 11,408,049 B2
(45) Date of Patent: *Aug. 9, 2022

(54) COLD ROLLED STEEL WIRE, METHOD AND REINFORCEMENT OF FLEXIBLE CONDUITS

(71) Applicant: ARCELORMITTAL WIRE FRANCE, Bourg en Bresse (FR)

(72) Inventors: Sylvain Foissey, Meximieux (FR); Gaëlle Bascourt, Viriat (FR)

(73) Assignee: ARCELORMITTAL WIRE FRANCE, Bourg en Bresse (FR)

( * ) Notice: Subject to any disclaimer, the term of this patent is extended or adjusted under 35 U.S.C. 154(b) by 306 days.

This patent is subject to a terminal disclaimer.

(21) Appl. No.: 16/596,137

(22) Filed: Oct. 8, 2019

(65) Prior Publication Data

US 2020/0032367 A1    Jan. 30, 2020

Related U.S. Application Data

(62) Division of application No. 15/107,857, filed as application No. PCT/FR2014/000301 on Dec. 22, 2014, now Pat. No. 10,550,448.

(51) Int. Cl.
*C21D 9/52*    (2006.01)
*C21D 1/30*    (2006.01)
(Continued)

(52) U.S. Cl.
CPC ........... *C21D 9/525* (2013.01); *B21F 1/00* (2013.01); *C21D 1/18* (2013.01); *C21D 1/20* (2013.01);
(Continued)

(58) Field of Classification Search
None
See application file for complete search history.

(56) References Cited

U.S. PATENT DOCUMENTS 5,407,744 A    4/1995  Mallen Herrero et al.
5,919,415 A    7/1999  Pchard
(Continued)

FOREIGN PATENT DOCUMENTS

CN    1646715 A    7/2005
EP    1712653 A1   10/2006
(Continued)

OTHER PUBLICATIONS

High Hydrogen Resistant Stainless Steel Spring Wire for Fuel Cells, p. 47, Nr: 57, SEI technical RE, Jan. 1, 2004 Sumitomo Electric Industries, Osaka, JP.
(Continued)

*Primary Examiner* — Colin W. Slifka
(74) *Attorney, Agent, or Firm* — Davidson, Davidson & Kappel, LLC

(57) ABSTRACT

A cold rolled steel wire having the following chemical composition expressed in percent by weight, 0.2≤C %≤0.6, 0.5≤Mn %≤1.0, 0.1≤Si≤0.5%, 0.2≤Cr≤1.0%, P≤0.020%, S≤0.015%, N≤0.010%, and optionally not more than 0.07% Al, not more than 0.2% Ni, not more than 0.1% Mo and not more than 0.1% Cu, the balance being iron and the unavoidable impurities due to processing. This wire has a microstructure including bainite and, optionally, up to 35% acicular ferrite and up to 15% pearlite. A fabrication method and flexible conduits for hydrocarbon extraction are also provided.

15 Claims, 1 Drawing Sheet

(51) Int. Cl.

| | |
|---|---|
| *C22C 38/04* | (2006.01) |
| *C22C 38/44* | (2006.01) |
| *C21D 1/18* | (2006.01) |
| *C22C 38/00* | (2006.01) |
| *C22C 38/40* | (2006.01) |
| *C21D 8/06* | (2006.01) |
| *C21D 1/26* | (2006.01) |
| *C22C 38/18* | (2006.01) |
| *C22C 38/22* | (2006.01) |
| *B21F 1/00* | (2006.01) |
| *C21D 1/20* | (2006.01) |
| *C21D 1/42* | (2006.01) |
| *C21D 1/60* | (2006.01) |
| *C21D 1/607* | (2006.01) |
| *C21D 9/00* | (2006.01) |
| *C22C 38/02* | (2006.01) |
| *C22C 38/06* | (2006.01) |
| *C22C 38/42* | (2006.01) |
| *E21B 17/01* | (2006.01) |

(52) U.S. Cl.
CPC ............... *C21D 1/26* (2013.01); *C21D 1/30* (2013.01); *C21D 1/42* (2013.01); *C21D 1/60* (2013.01); *C21D 1/607* (2013.01); *C21D 8/06* (2013.01); *C21D 8/065* (2013.01); *C21D 9/0018* (2013.01); *C21D 9/52* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/18* (2013.01); *C22C 38/22* (2013.01); *C22C 38/40* (2013.01); *C22C 38/42* (2013.01); *C22C 38/44* (2013.01); *E21B 17/01* (2013.01); *C21D 2211/002* (2013.01); *C21D 2211/005* (2013.01); *C21D 2211/009* (2013.01); *Y02P 10/25* (2015.11)

(56) References Cited

U.S. PATENT DOCUMENTS

| | | | |
|---|---|---|---|
| 5,922,149 | A | 7/1999 | Mallen Herrero et al. |
| 6,106,637 | A | 8/2000 | Arnaud et al. |
| 6,596,098 | B1 | 7/2003 | Nishida et al. |
| 8,926,768 | B2 | 1/2015 | Suzuki et al. |
| 9,249,486 | B2 | 2/2016 | Foissey et al. |
| 2013/0186521 | A1 | 7/2013 | Foissey et al. |

FOREIGN PATENT DOCUMENTS

| | | |
|---|---|---|
| JP | 2001073081 A | 3/2001 |
| JP | 2010222671 A | 10/2010 |
| JP | 2012229475 A | 11/2012 |
| JP | 2004100038 A | 9/2013 |
| JP | 2013534966 A | 9/2013 |
| JP | 2015168882 A | 9/2015 |
| KR | 100285258 B1 | 1/2001 |
| KR | 1020010042224 A | 5/2001 |
| RU | 2102502 C1 | 1/1998 |
| RU | 2177510 C2 | 12/2001 |
| RU | 2201468 C2 | 3/2003 |
| WO | 9628575 A1 | 9/1996 |
| WO | 2005075697 A1 | 8/2005 |
| WO | 2011039885 A1 | 4/2011 |
| WO | 2011062012 A1 | 5/2011 |
| WO | 2013154129 A1 | 10/2013 |

OTHER PUBLICATIONS

Yoshiro Fujino et al., "Development of Highly Hydrogen-resistant Stainless Steel Spring Wire", pp. 60-64, Nr: 51, New Materials Japan, Jan. 30, 2006, Japan.

COLD ROLLED STEEL WIRE, METHOD AND REINFORCEMENT OF FLEXIBLE CONDUITS

This application is a divisional of U.S. application Ser. No. 15/107,857 filed Jun. 23, 2016, issued as U.S. Pat. No. 10,550,448, which is a 371 of PCT/FR14/00301, filed Dec. 22, 2014, which claims priority to PCT/FR13/00370 filed Dec. 24, 2013, the entire disclosures of which are hereby incorporated by reference.

The present invention relates to the field of metallurgy as applied to maritime oil extraction. It relates in particular to steel wires that can be used as reinforcing or structural elements of components or structures submerged in deep water, such as flexible offshore conduits, whether they are used to transport liquid or gas hydrocarbons.

BACKGROUND

It is known that a primary requirement relating to wires of this type, in addition to excellent mechanical characteristics, is good resistance to hydrogen embrittlement in an acid environment where sulfur is present, in particular in the form of $H_2S$ which is present in the fluids and hydrocarbons being transported.

The steel wires currently commercially available for offshore utilization are principally made of the low-alloy grades that have a tensile strength Rm of approximately 800 MPa.

To fabricate these cold rolled wires in the known manner, manganese steels comprising from 0.15 to 0.80% by weight carbon are used, the initial microstructure of which is ferritic-pearlitic. After shaping of the initial round rolled wire rod, an appropriate stress-relief heat treatment is applied to achieve the required hardness. However, the cold rolled wires obtained by these conventional processes cannot withstand the relatively severe acidity encountered in deep waters, due to the strong presence of $H_2S$ in the hydrocarbons transported.

In addition, flexible offshore conduits must currently be appropriate for use at increasingly greater underwater depths, which requires an increase in the mechanical breaking strength beyond 800 MPa as well as corrosion-fatigue strength enabling them to resist corrosion generated by the presence of $H_2S$ and $CO_2$.

In addition, market constraints regarding prices are becoming increasingly tight, which has an adverse effect on the customary use of noble alloy elements such as chromium, niobium etc. or long or multiple and therefore expensive processing steps, above all if they must be carried out under hot conditions.

BRIEF SUMMARY

An object of the invention is to make available a steel wire that has very good properties of resistance to hydrogen embrittlement in an acid environment (of the $H_2S$ type) and very good corrosion-fatigue strength properties ($CO_2+H_2S$) to satisfy the new constraints in the oil and gas markets, in particular by employing a low-alloy steel composition.

More particularly, an objective is the absence of internal cracks after tests under stress for 30 days at a pH of 4.1 in an environment containing 5 mbar $H_2S$ or even more (resistance to hydrogen embrittlement).

An additional objective is the absence of fatigue failure after 2 million bending cycles under an alternating stress of +100 MPa to +600 MPa in a corrosive environment containing $CO_2$ and $H_2S$. Even more particularly and preferably, an objective is the absence of fatigue failure even up to 4 million cycles (corrosion-fatigue strength).

In addition to these usage properties of the wire, an additional objective is excellent mechanical properties and, in particular, mechanical breaking strength from 800 to 1300 MPa and a ductility A greater than or equal to 10% to facilitate the shaping operations.

The present invention provides a cold rolled steel wire, having the following chemical composition, expressed in percent by weight:
0.2≤C %≤0.6;
0.5≤Mn %≤1.0;
0.1≤Si≤0.5%;
0.2≤Cr≤1.0%;
P≤0.020%;
S≤0.015%;
N≤0.010%;
and optionally not more than 0.07% Al, not more than 0.2% Ni, not more than 0.1% Mo and not more than 0.1% Cu, the balance being iron and the unavoidable impurities due to processing, wherein this wire has a microstructure comprising bainite and, optionally, up to 35% acicular ferrite and up to 15% pearlite.

The present invention also provides a fabrication method for a cold rolled wire comprising the steps of:

procuring a hot rolled steel wire rod, the diameter of which is greater than or equal to 10 mm, subjecting this wire rod to an austenitization heat treatment at a temperature greater than 950° C., then cooling this wire rod by an isothermal quenching to a temperature between 350 and 600° C. to obtain a structure comprising at least 50% bainite and, optionally, up to 35% acicular ferrite and up to 15% pearlite, then finishing the cooling to ambient temperature at a cooling rate between 30° C./s and 100° C./s, subjecting this cooled wire rod to a cold mechanical transformation operation conducted with a total rate of work hardening between 40 and 90% to obtain a mechanical tensile strength Rm of at least 800 MPa, then subjecting it to an optional stress relief heat treatment.

The present invention further provides a flexible conduit for the hydrocarbon extraction sector comprising at least one cold rolled wire or obtained by a fabrication method.

BRIEF DESCRIPTION OF THE DRAWINGS

A preferred embodiment of the present invention will be elucidated with reference to the following drawings, in which.

DETAILED DESCRIPTION

Figure 1:
FIG. 1 is a micrographic image showing the different constituents of the microstructure obtained with grade 1 (bainite, acicular ferrite and lamellar pearlite) and that comprises less than 35% acicular ferrite and less than 15% pearlite.

According to the present invention, the grade of steel used for the wires according to the invention comprises the following elements in percent by weight:
0.2≤C %≤0.6
0.5≤Mn %≤1.0

$0.1 \leq Si \leq 0.5\%$
$0.2 \leq Cr \leq 1.0\%$
$P \leq 0.020\%$
$S \leq 0.015\%$
$N \leq 0.010\%$
and optionally not more than 0.07% Al, not more than 0.2% Ni, not more than 0.1% Mo and not more than 0.1% Cu.

The carbon content is between 0.2 and 0.6 wt. %. The low value makes it possible to guarantee the achievement of sufficient hardness at the exit from the heat treatment. The maximum content is limited to 0.6% to sufficiently protect the ductility necessary for cold-forming during the fabrication of the wire.

The manganese content is between 0.5 and 1.0 wt. %. The low value makes it possible to guarantee the achievement of the desired majority bainite microstructure. The maximum content is limited to 1.0% to prevent the formation of relatively non-deformable phases such as martensite.

The silicon content is between 0.1 and 0.5 wt. %. The low value, in combination with the low chromium level, makes it possible to guarantee the achievement of the microstructure specified by the invention in the entire cross section of the shaped wire. The maximum content is limited to 0.5%, here again to prevent the formation of martensite during the heat treatment, because this phase is subsequently not deformable.

The chromium content is between 0.2 and 1.0 wt. %. The low value, in combination with the low level of silicon, makes it possible to guarantee the achievement of the microstructure specified by the invention in the entire cross section of the shaped wire. The maximum content is limited to 1.0% to prevent the formation of martensite during the heat treatment.

The phosphorus content is limited to 0.020 wt. % to limit segregations, which have an adverse effect on the hydrogen embrittlement resistance and on fatigue behavior.

The sulfur content is limited to 0.015 wt. % to limit the presence of inclusions, which have an adverse effect on fatigue behavior and hydrogen embrittlement.

The nitrogen content is limited to 0.010 wt. % to limit the presence of nitrides, which have an adverse effect on fatigue behavior.

The grade can also comprise up to 0.07% Al, up to 0.2% Ni, up to 0.1% Mo and up to 0.1% Cu. The presence of these elements is limited because they are the cause of dispersive behaviors during the heat treatment.

Another essential element of the wire according to the present invention is that the microstructure of the steel of which they are made includes bainite. It can also include acicular ferrite up to an area percentage of 35%. Generally lamellar pearlite can also be present up to an area percentage of 15%, preferably up to an area percentage of 10% and more particularly preferably is completely absent from the microstructure because its presence is not desirable.

The desired microstructure can therefore be bainitic or bainitic-ferritic, the sum of the bainite and acicular ferrite phases being preferably greater than an area percentage of 50%, preferably greater than 70% and most particularly preferably greater than 90%, or even equal to an area percentage of 100%.

Besides pearlite, the proportion of which is limited, it is also desirable to avoid the presence of martensite, which would make it impossible to fabricate a wire according to the present invention.

The cold rolled wires according to the present invention (sometimes called shaped wire) may assume any cross section appropriate to their final utilization. In particular, they may have a straight round cross section, which is generally obtained, for example, by simple drawing from a larger-diameter wire rod.

They can also have a cross section that is rectangular or flat or U-shaped, Z-shaped, T-shaped etc., which will generally require the combination of a drawing operation and a rolling operation. These latter cross sections with a more complex shape will make it possible for the wires to be fitted into one another on the edges or to be fastened together to form articulated bracing bundles.

They are more particularly intended for offshore oil operations to constitute the reinforcing wire, tie wire or arch wires that go into the structure of pipelines and other flexible conduits. The cold rolled steel wires go around inside the pipelines between two layers of extruded polymers in a so-called "annular" zone.

The wires according to the present invention can be fabricated by any suitable process that makes it possible to obtain the desired usage characteristics. However, it is preferable to use the method according to the present invention, which includes the steps comprising of:

procuring a hot rolled steel wire rod, the diameter of which is greater than or equal to 10 mm, subjecting this wire rod to an austenitization heat treatment at a temperature greater than 950° C., then cooling this wire rod by an isothermal quenching to a temperature between 350 and 600° C. to obtain a structure comprising at least 50% bainite and, optionally, up to 35% acicular ferrite and up to 15% pearlite, then finishing the cooling to ambient temperature at a cooling rate between 30° C./s and 100° C./s, subjecting this cooled wire rod to a cold mechanical transformation operation conducted with a total rate of work hardening between 40 and 90% to obtain a mechanical tensile strength Rm of at least 800 MPa, then subjecting it to an optional stress relief heat treatment.

The method according to the present invention can also comprise the following characteristics, considered individually or in combination:

the austenitization heat treatment undergone by the wire rod is performed continuously, preferably in a gas furnace or in an induction furnace, on the previously unspooled wire, the austenitization heat treatment is performed for a length of time between 2 and 10 minutes, the wire rod is cooled by isothermal quenching in a molten, preferably lead- or salts-based (mixture of sodium or potassium nitrates/nitrites), bath or in a fluidized bed of the same elements, the immersion time being preferably between 1 and 10 minutes, preferably followed by a water cooling, the cold mechanical transformation operation comprises a drawing step followed by a cold rolling step, the drawing being preferably performed to obtain a cross section reduction of at least 15 or even 20%, and the cold rolling is preferably performed to obtain a thickness reduction of at least 30%, the cold mechanical transformation operation is performed to obtain a mechanical tensile strength Rm of at least 1000 MPa and is followed by a stress relief heat treatment performed so as not to reduce the mechanical tensile strength Rm to below 800, or even 850 or 900 MPa.

A flexible conduit for the hydrocarbon extraction sector is further provided. The conduit includes at least one cold rolled wire according to a preferred embodiment of the present invention or obtained by the fabrication method of a preferred embodiment of the present invention.

The stress relief operation makes it possible, among other things, to improve the resistance of the wire to hydrogen embrittlement.

To better explain the present invention, tests were conducted, although the tests are merely for purposes of illustration and are not intended to be restrictive.

Tests

The tests conducted to evaluate the performance of the wire according to the present invention were conducted under the following conditions:

Hydrogen Embrittlement (HIC & SSCC Test—NACE TM0177 and NACE TM0284 Standards)

The steel wire was immersed in an aqueous solution having a pH of 4.1, through which a gas containing $CO_2$ and 5 mbar of $H_2S$ was bubbled, under a stress of 650 MPa. The test was conducted over 30 days, at the conclusion of which the wire was examined using ultrasound to check for the potential presence of internal cracks.

Fatigue Strength in a Corrosive Environment

The steel wire was immersed in an aqueous solution having a pH of 5, through which a gas containing $CO_2$ and up to 5 mbar of $H_2S$ was bubbled, under an alternating bending stress of 100 MPa to 500 MPa. The test was stopped when the wire broke and the number of millions of cycles reached was recorded.

First a series of grades was prepared, the chemical composition of which, in wt. %, is listed in Table 1:

TABLE 1

| | C | Mn | Si | Cr | P | S | N | Al | Ni | Mo | Cu |
|---|---|---|---|---|---|---|---|---|---|---|---|
| 1 | 0.360 | 0.680 | 0.210 | 0.250 | 0.010 | 0.011 | 0.007 | 0.045 | 0.050 | 0.010 | 0.050 |
| 2 | 0.340 | 0.700 | 0.180 | 0.350 | 0.011 | 0.008 | 0.006 | 0.043 | 0.060 | 0.015 | 0.060 |
| 3 | 0.320 | 0.725 | 0.180 | 0.406 | 0.011 | 0.010 | 0.003 | 0.020 | 0.020 | 0.015 | 0.009 |

For grades 1 to 3, hot rolled round wire rods 15 mm in diameter were then conventionally fabricated, which were coiled in a spool. In a second step, the previously unspooled wire was then austenitized at 1000° C. in a gas furnace for 6 minutes.

Figure 2:
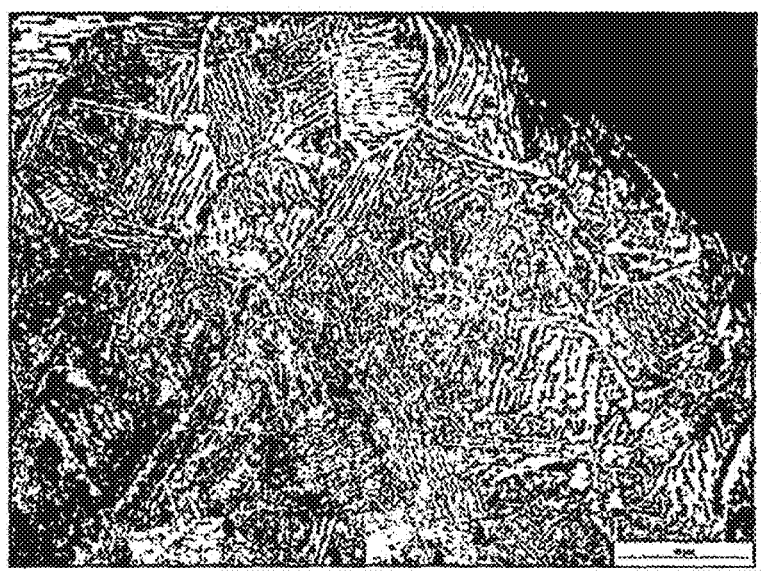
FIG. 2 is a micrographic image showing the different constituents of the microstructure obtained with grade 3 comprising 70% bainite and 30% acicular ferrite and lamellar pearlite.

An isothermal quenching was then carried out in a bath of molten lead for 5 minutes at 500° C. for grades 1 and 2 and at 410° C. for grade 3, followed by a water cooling to give the wire a ferrite/bainite structure. FIG. 1 is a micrographic image showing the different constituents of the microstructure obtained with grade 1 (bainite, acicular ferrite and lamellar pearlite) and that comprises less than 35% acicular ferrite and less than 15% pearlite. FIG. 2 is a micrographic image showing the different constituents of the microstructure obtained with grade 3 comprising 70% bainite and 30% acicular ferrite and lamellar pearlite.

The wires were then drawn with a cross section reduction of 30% to obtain a round wire with a diameter of 12.54 mm, then cold rolled with a thickness reduction of 50% to obtain a flat wire, having a cross section of 16 mm×6.3 mm. The total work hardening rate that corresponds to the percentage of cross section reduction at the conclusion of the two cold operations here was 57%. The wires were then subjected to a stress relief annealing at a temperature of 600° C. for 30 seconds.

They were then subjected to tests to evaluate their usage properties, the results of which are presented in Table 2:

TABLE 2

| Grade | Rm (MPa) | A (%) | Number of internal cracks | Millions of cycles before fracture |
|---|---|---|---|---|
| 1 | 900 | 13 | 0 (650 MPa) | 2,000,000 |
| 2 | 1000 | 11 | 0 (650 MPa) | 5,000,000 |
| 3 | 1200 | 11 | 0 (650 MPa) | 1,800,000 |

NR: not performed

The invention is not limited to the examples described above, but extends to multiple variants and equivalents.

What is claimed is:

1. A fabrication method for a cold rolled wire comprising the steps of:
   procuring a hot rolled steel wire rod having a chemical composition comprising, expressed in percent by weight:
   0.2≤C %≤0.6;
   0.5≤Mn %≤1.0;
   0.1≤Si≤0.5%;
   0.2≤Cr≤1.0%;
   P≤0.020%;
   S≤0.015%; and
   N≤0.010%;
   a balance being iron and the unavoidable impurities due to processing; the diameter of said hot rolled steel wire being greater than or equal to 10 mm;
   subjecting the wire rod to an austenitization heat treatment at a temperature greater than 950° C.; then
   cooling the wire rod by an isothermal quenching to a temperature that is from 350 to 600° C. to obtain a structure comprising at least 50% bainite and no martensite, and then finishing the cooling to ambient temperature at a cooling rate that is from 30° C./s to 100° C./s; and
   subjecting the cooled wire rod to a cold mechanical transformation operation conducted with a total rate of work hardening from 40 to 90% to obtain a mechanical tensile strength Rm of at least 800 MPa.

2. The fabrication method according to claim 1, further comprising the step of:
   subjecting the wired rod to a stress relief heat treatment.

3. The fabrication method according to claim 1, wherein the structure includes up to 35% acicular ferrite or up to 15% pearlite.

4. The fabrication method according to claim 1, wherein the austenitization heat treatment undergone by the wire rod is performed continuously in a gas furnace or in an induction furnace on a previously unspooled wire.

5. The fabrication method according to claim 1, wherein the austenitization heat treatment is performed for a length of time from 2 to 10 minutes.

6. The fabrication method according to claim 1, wherein the wire rod is cooled by isothermal quenching in a molten lead- or salts-based bath and the immersion time is from 1 to 10 minutes, followed by a water cooling.

7. The fabrication method according to claim 1, wherein the cold mechanical transformation operation includes a drawing step followed by a cold rolling step, the drawing step resulting in a reduction of a cross section by at least 15% and the cold rolling step resulting in a reduction of a thickness by at least 30%.

8. The fabrication method according to claim 1, wherein the cold mechanical transformation operation results in a mechanical tensile strength Rm of at least 1000 MPa and is followed by a stress relief heat treatment carried out so as not to reduce the mechanical tensile strength Rm to less than 800 MPa.

9. A fabrication method for a cold rolled wire consisting of the following steps:
procuring a hot rolled steel wire rod having a chemical composition comprising, expressed in percent by weight:
$0.2 \leq C \% \leq 0.6$;
$0.5 \leq Mn \% \leq 1.0$;
$0.1 \leq Si \leq 0.5\%$;
$0.2 \leq Cr \leq 1.0\%$;
$P \leq 0.020\%$;
$S \leq 0.015\%$; and
$N \leq 0.010\%$;
a balance being iron and the unavoidable impurities due to processing; the diameter of said hot rolled steel wire being greater than or equal to 10 mm;
subjecting the wire rod to an austenitization heat treatment at a temperature greater than 950° C.; then
cooling the wire rod by an isothermal quenching to a temperature that is from 350 to 600° C. to obtain a structure comprising at least 50% bainite, no martensite, and optionally up to 35% acicular ferrite and up to 15% pearlite, then finishing the cooling to ambient temperature at a cooling rate that is from 30° C./s to 100° C./s; and
subjecting the cooled wire rod to a cold mechanical transformation operation conducted with a total rate of work hardening from 40 to 90% to obtain a mechanical tensile strength Rm of at least 800 MPa; and
optionally subjecting the wired rod to a stress relief heat treatment.

10. The fabrication method according to claim 9, wherein the structure includes up to 35% acicular ferrite or up to 15% pearlite.

11. The fabrication method according to claim 9, wherein the austenitization heat treatment undergone by the wire rod is performed continuously in a gas furnace or in an induction furnace on a previously unspooled wire.

12. The fabrication method according to claim 9, wherein the austenitization heat treatment is performed for a length of time from 2 to 10 minutes.

13. The fabrication method according to claim 9, wherein the wire rod is cooled by isothermal quenching in a molten lead- or salts-based bath and the immersion time is from 1 to 10 minutes, followed by a water cooling.

14. The fabrication method according to claim 9, wherein the cold mechanical transformation operation includes a drawing step followed by a cold rolling step, the drawing step resulting in a reduction of a cross section by at least 15% and the cold rolling step resulting in a reduction of a thickness by at least 30%.

15. The fabrication method according to claim 9, wherein the cold mechanical transformation operation results in a mechanical tensile strength Rm of at least 1000 MPa and is followed by a stress relief heat treatment carried out so as not to reduce the mechanical tensile strength Rm to less than 800 MPa.

* * * * *